United States Patent [19]
Johnson

[11] 3,842,457
[45] Oct. 22, 1974

[54] BEE FEEDER
[75] Inventor: Elliott C. Johnson, Stockton, Calif.
[73] Assignee: Valley Honey Cooperative, Stockton, Calif.
[22] Filed: July 3, 1973
[21] Appl. No.: 376,160

[52] U.S. Cl. .................................. 6/5, 220/97 C
[51] Int. Cl. ........................................ A01k 53/00
[58] Field of Search .......... 6/5; 220/97 C, 97 D, 74, 220/22 R, 22.1, 22.2, 94 A

[56] References Cited
UNITED STATES PATENTS
2,496,285  2/1950  Goebel ................................ 6/5
3,715,853  2/1973  Bemiss ........................ 220/97 C Primary Examiner—Antonio F. Guida
Assistant Examiner—J. Q. Lever
Attorney, Agent, or Firm—Clelle W. Upchurch

[57] ABSTRACT

A molded synthetic resinous bee feeder having a configuration corresponding substantially to the configuration and dimensions of a conventional brooder frame and adapted to be substituted in a conventional bee hive for one of the brooder frames is provided. The bee feeder is molded from a synthetic resin which is non-toxic to bees and is of sufficient rigidity to support the bee food in the bee hive without substantial sagging and distortion. The bee feeder is adapted to be supported in the hive on the conventional rail by a reinforced integral bracket.

12 Claims, 4 Drawing Figures

PATENTED OCT 22 1974  3,842,457

BEE FEEDER

This invention relates generally to bee feeders and more particularly to a novel and improved molded plastic container for bee food adapted to be suspended in a conventional bee hive.

Bees must be fed by the bee-keeper in the winter when the bees cannot fly or when there are no flowers or other available sources of bee food. A liquid or dry sugar product is placed in the bee hive usually in late fall and again in early spring to avoid starvation.

Containers adapted for storage of bee food have been disclosed heretofore. For example, a metal or plastic feeder tank is disclosed in U.S. Pat. No. 2,496,285. The disclosed bee feed is rectangular in cross-section and is an elongated narrow tank adapted to be suspended in the hive along one of the sidewalls. A bracket is fastened to each end wall of the bee feeder for suspending it on rails provided on the end walls of the hive. Such a bee feeder has the disadvantage that the inner surface of the walls thereof must be roughened to prevent the bees from falling into the food and the brackets frequently become separated from the walls or otherwise fail to support the feeder in the hive. A bee feeder adapted to be used externally of a bee hive is disclosed in U.S. Pat. No. 3,526,913. This feeder has the disadvantage of being outside the bee hive and accessible to vandals.

It is therefore an object of this invention to provide a novel and improved plastic bee feeder adapted to be suspended among brooder frames in a conventional bee hive. Another object of the invention is to provide a rigid, tough molded plastic bee feeder of solid one-piece construction which is not toxic to bee. Still another object of the invention is to provide molded plastic bee feeders adapted to be nested for shipping or storage and having rugged inseparable bracket means for suspending them in a bee hive.

Other objects will become apparent from the following description with reference to the accompanying drawing wherein FIG. 1 is a perspective view, partially broken away, of a conventional bee hive illustrating one embodiment of the bee feeder provided by the invention disposed therein;

Figures 1, 2, 3, 4:
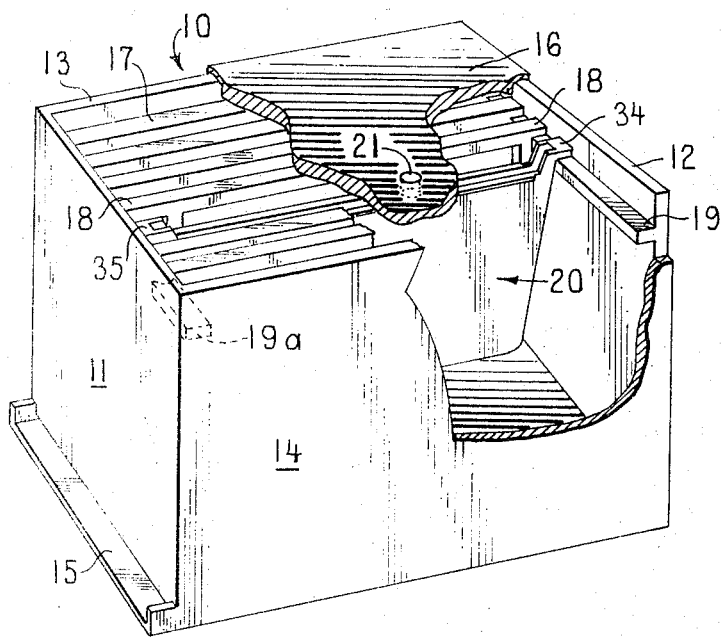
FIG. 2 is a perspective view of an embodiment of the one-piece bee feeder provided by the invention.
FIG. 3 is a cross-section taken along the line 3—3 of FIG. 2.
FIG. 4 is an enlarged fragmentary perspective view illustrating a top corner of the embodiment of FIG. 2.

The foregoing objects and others are accomplished in accordance with this invention, generally speaking, by providing a molded plastic or synthetic resinous container having rigid integral reinforced brackets for suspending it on the rails of a conventional bee hive and having an inverted frusto-triangularly shaped cross-section to facilitate nesting thereof for shipping or storage. More specifically, the bee feeder may be an injected molded one-piece rigid synthetic resinous container having integral sidewalls, bottom wall and end walls each carrying a bracket having a top wall supported on end walls, a recessed side wall and spaced reinforcing ribs which extend between the wall of the container and the recessed sidewall to strengthen the bracket. In a preferred embodiment, the end walls and adjacent relatively narrow portions of the sidewalls of the container extend above the upper edge of the remainder of the sidewalls to form an integral generally inverted L-shaped bracket. The normally horizontal top of the bracket is an outwardly projecting rectangularly shaped flange on the end wall. Depending end walls and a side wall shaped from the end wall of the container but recessed inwardly of the free edge of the bracket enclose a hollow space under the bracket top. A pair of internal ribs in spaced relationship with the end walls of the bracket and parallel thereto are integral with the end wall of the container and the top and sidewall of the bracket. Three external ribs integral with the top wall and the sidewall of the bracket extend outwardly from the sidewall under the top of the bracket to a point flush with the edge of the top wall. Two of the latter ribs have the same longitudinal axes as the ribs between the end wall of the container and the sidewall of the bracket. The third external rib is centrally disposed between the other two external ribs. Longitudinally spaced pairs of oppositely disposed ribs are provided on the inner surface of the sidewalls to prevent the insertion of one feeder in the other when nesting them one in the other to a depth where later separation thereof is difficult.

The bee feeder is preferably fabricated by injection molding polypropylene or any other suitable thermoplastic synthetic resin such as high density polyethylene which is non-toxic to bees and which will provide rigid container walls and brackets. In order to provide the rigidity required to avoid sagging under the weight of the bee food, the molded resin should have a modulus in flexure of at least about $180 \times 10^3$ pounds per square inch as determined by ASTM–D790–70. Other suitable resins include polycarbonate, polyurethane compositions and polyvinyl chloride compositions which are not toxic to bees or to the consumer of honey produced in a hive containing the bee feeder.

Referring now to the drawing, a conventional bee hive 10 is illustrated in FIG. 1. Bee hive 10 is a wooden box having sidewalls 13 and 14, front end wall 11, rear end wall 12, bottom wall 15 which extends outwardly in front of front wall 11 to form a platform and a removable top 16. The lower edge of front end wall 11 is spaced above bottom wall 15 to provide an entrance to the hive for the bees. Conventional rectangularly shaped brooder frames 17 are suspended in side by side relationship in the hive by the conventional extended end portions 18 of the top frame members disposed on rails 19 and 19a.

An embodiment of the bee feeder 20 provided by the invention is shown disposed between brooder frames 17 in hive 10. One or more holes 21 may be provided through top 16 above the open top 22 of bee feeder 20 for replenishing the supply of bee food in feeder 20 without removing top 16.

Referring now to FIGS. 2 and 3, bee feeder 20 is a one-piece injection molded polypropylene container having integral rigid thin sidewalls 22 and 23, end walls 24 and 25 and bottom wall 26 enclosing a cavity having an open top. The edges formed at the juncture of the various walls are rounded or arcuate to avoid sharp edges and to assist in removing the bee feeder from the mold. The width of bottom wall 26 is less than the width of open top 27 to provide a frusto-triangularly shaped cross-section as illustrated in FIG. 3. A pair of internal ribs 28 and 29 on sidewalls 22 and 23 are spaced longitudinally from end wall 25 and a similar pair of ribs 30 and 31 are spaced longitudinally from end wall 24. As shown in FIGS. 2 and 3, ribs 28, 29, 30 and 31 extend upwardly from bottom 26 less than one-half of the height of sidewalls 22 and 23. These ribs strengthen the base portion of sidewalls 22 and 23 and also limit the penetration of one bee feeder 20 into another when they are nested to conserve space for shipping or storage. Longitudinally extending beads 32 and 33 on the upper edge of sidewalls 22 and 23 strengthen the top of the sidewalls.

As illustrated in FIGS. 2 and 4, brackets 34 and 35 are integral with end walls 24 and 25. An integral flange extending outwardly from end wall 25 forms top wall 36 of bracket 35. A narrow portion of sidewall 22 extends upwardly above beaded edge 32 and is integral with sidewalls 37 and 38 which depend from top 36. A recessed transverse rib or sidewall 39 is integral with top 36 and ends 37 and 38 and is of substantially the same width as ends 37 and 38. Spaced ribs 40 and 41 are integral with top wall 36, end wall 25 of the container and recessed sidewall 39 and bridge the space between walls 25 and 39. Ribs 42 and 43 are integral with sidewall 39 and top 36 and are directly opposite wall 39 from ribs 40 and 41. A rib 44 similar to ribs 42 and 43 is centrally disposed therebetween. Bracket 35 is identical to bracket 34. The combination of the ribs, recessed sidewall and end walls molded from polypropylene provides sufficient strength to support a full bee feeder in the bee hive without distortion or sagging of the brackets.

Bee feeder 20 may be disposed in the bee hive along one of its walls with brackets 34 or 35 on rails 19 and 19a or between any pair of brooder frames 17. The length of the bee feeder between end walls 24 and 25 at the point where they join walls 37 and 38 of the brackets 34 and 35, the distance from the bottom of end walls 37 and 38 and the external surface of bottom 26 and the width of the open top are substantially equal to the corresponding dimensions of a conventional brooder frame 17 so that a bee feeder will occupy substantially the same space as a brooder frame 17 in hive 10. In other words, it is preferred that the dimensions of the bee feeder corresponds to those of a conventional brooder frame so the feeder can be installed in a hive after removing one or two brooder frames.

The bee feeder may be formed by any convenient molding process such as blow molding, but it is preferred to form it by injection molding.

It has been found that it is unnecessary to roughen the inner surface of the inwardly sloping walls of the container to avoid drowning of the bees.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A synthetic resinous container for storage of bee food adapted to be disposed in a bee hive among brooder frames supported on rails in the bee hive, said container having bottom, sidewalls and end walls which combine to enclose a cavity having a top which is open for the entrance of bees from the hive, said bottom being narrower than the top, and a pair of brackets integral with the end walls of the container and adapted to be disposed on said rails to support the container in a bee hive, each of said brackets having a top wall integral with an end wall of the container, a second wall spaced outwardly from and substantially parallel with the end wall of the container depending from the top wall of the bracket, and a pair of spaced walls integral with and depending from the top wall of the bracket and integral at one end with the end of the container and at the other end with said second wall.

2. The bee feeder of claim 1 wherein a pair of reinforcing ribs integral with the top wall and second wall of the bracket and the end wall of the container bridge the space between the container wall and the sidewall of the bracket.

3. The bee feeder of claim 1 having external dimensions corresponding substantially to those of a brooder frame.

4. The bee feeder of claim 1 in which the walls are molded polypropylene.

5. A bee hive having top, bottom, side and front and rear end walls enclosing a cavity therein, transverse rails secured to the end walls near the top thereof, a plurality of brooder frames suspended between the rails in the cavity, and a bee feeder having rigid synthetic resinous sidewalls, end walls, bottom wall and top which is open for entrance of bees from the hive, and an integral bracket at each end thereof adjacent to the top of the feeder supporting the bee hive among the brooder frames, each of said brackets having a top wall, a second wall spaced from and substantially parallel with the end wall of the container integral with and depending from the top wall, a pair of walls depending and integral with the top wall and between the end wall of the container and the said second wall of the bracket, and means between said pair of walls for strengthening the bracket.

6. The bee hive of claim 5 wherein said means for strengthening the bracket is at least one rib integral with the top wall of the bracket and extending between the end wall of the container and the said first wall of the bracket.

7. The container of claim 1 having strengthening means for the bracket disposed between said depending pair of walls.

8. The bee hive of claim 5 wherein the bee feeder is polypropylene.

9. The bee hive of claim 5 wherein the top of the bee hive has a hole therethrough disposed over the open top of the bee feeder.

10. A bee feeder having a container comprising integral, rigid synthetic resinous bottom wall, sidewalls and end walls enclosing a cavity with an open top, the bottom wall being of less cross-section than the open top, ribs on the inner surface of the sidewalls which prevent complete penetration of one feeder by another inserted therein, an integral bracket disposed adjacent to the top of each end wall, said bracket having a top wall extending outwardly at a right angle from the end wall and having depending sidewall and end walls integral with the top wall, the sidewall of the bracket being recessed under the edge of the top wall, a pair of reinforcing ribs integral with the top wall and sidewall of the bracket and with the end wall of the container and bridging the space between the end wall of the container and sidewall of the bracket, and spaced ribs integral at one end with the top wall of the bracket and with the recessed sidewall of the bracket with their edges substantially flush with the overlying edge of the top of the bracket.

11. In a bee hive having a top, bottom, side and end walls enclosing a parallelepiped shaped cavity and oppositely disposed rails secured to the inner surfaces of the end walls, a bee feeder comprising rigid synthetic resinous walls enclosing a cavity having a top which is open for the entrance of bees from the hive and a pair of brackets integral with the walls disposed on the rails and supporting the bee feeder in the cavity, said feeder having a bottom wall which is narrower than the open top whereby the feeder is inverted frusto-triangularly shaped in cross-section and an inverted L-shaped integral bracket is disposed at the top of each end wall and extends outwardly therefrom, said bracket having a substantially flat top, depending end walls along the edges of the top and a depending sidewall which is substantially parallel to the end wall of the feeder, and a plurality of integral ribs bridging the space between the bracket sidewall and the end wall of the container.

12. In a bee hive having a top, bottom, side and end walls enclosing a parallelepiped shaped cavity and oppositely disposed rails secured to the inner surfaces of the end walls, a bee feeder comprising rigid synthetic resinous walls enclosing a cavity having a top which is open for the entrance of bees from the hive and a pair of brackets integral with the walls disposed on the rails and supporting the bee feeder in the cavity, each of said brackets having a top wall, a second wall spaced from and substantially parallel with the end wall of the container, said second wall being integral with and depending from the top wall, and a pair of walls integral with and depending from the top wall which extend between the end wall of the container and the said first wall of the bracket and have one end integral with the said second wall and the other integral with the end wall of the container.

* * * * *